United States Patent [19]
Gardenier, Jr.

[11] Patent Number: 5,368,753
[45] Date of Patent: Nov. 29, 1994

[54] ANTIFREEZE RECLAMATION SYSTEM AND PROCESS

[76] Inventor: Ransen Gardenier, Jr., 9 Scott Dr., Troy, N.Y. 12180

[21] Appl. No.: 83,046

[22] Filed: Jun. 28, 1993

[51] Int. Cl.5 .............................................. B01D 21/00
[52] U.S. Cl. ................................... 210/800; 210/799; 210/681; 210/295; 210/265; 210/454; 210/513
[58] Field of Search .............. 210/800, 513, 295, 259, 210/265, 282, 681, 688, 454, 799; 137/566

[56] References Cited

U.S. PATENT DOCUMENTS

| | | | |
|---|---|---|---|
| 1,579,448 | 4/1926 | Homewood . | |
| 1,636,285 | 7/1927 | Catron | 210/295 |
| 1,727,554 | 9/1929 | Millard . | |
| 2,120,515 | 6/1938 | Stoeckly . | |
| 3,372,808 | 3/1968 | Sabo | 210/259 |
| 3,763,887 | 10/1973 | MacVey et al. | 137/216 |
| 4,248,710 | 2/1981 | Rampignon . | |
| 4,625,801 | 12/1986 | McLaughlin et al. | 210/800 |
| 4,946,595 | 8/1990 | Miller, Jr. . | |
| 4,961,842 | 10/1990 | Schulz et al. . | |
| 5,223,144 | 6/1993 | Woyciesjes et al. | 210/724 |
| 5,245,842 | 9/1993 | Searfoss et al. | 210/282 |

*Primary Examiner*—Robert A. Dawson
*Assistant Examiner*—Ana M. Fortuna
*Attorney, Agent, or Firm*—Schmeiser, Morelle & Watts

[57] ABSTRACT

The invention is an antifreeze reclamation system that is designed for low volume processing over extended time periods. The system makes use of a tank that is preferably fabricated from a standard fifty-five gallon drum. Attached to the top of one end of the tank is a standpipe used for inputting used antifreeze into the system. A second standpipe is located at the top of the opposite end of the tank. The system functions by allowing gravity, buoyancy and time to separate the used antifreeze from entrained and dissolved impurities. The outputted liquid is mixed with new materials to restore it to its original, unused condition.

18 Claims, 3 Drawing Sheets

ANTIFREEZE RECLAMATION SYSTEM AND PROCESS

FIELD OF THE INVENTION

The invention is in the field of fluid reclamation systems. More particularly, the invention is a system for recycling the liquid coolant used in an internal combustion engine. The system treats the used coolant, typically known as antifreeze, by first removing any non-desired impurities entrained in the liquid. New materials are then added to the liquid so that it regains the characteristics of unused antifreeze.

BACKGROUND OF THE INVENTION

Most internal combustion engines make use of a circulating liquid to partially remove the heat generated by the combustion process. This liquid is predominantly water that is mixed with glycol-based and/or alcohol-based materials and assorted other compounds. The alcohol and/or glycol-based materials primarily function to raise the water's boiling point and to lower its freezing point. The other added compounds perform ancillary functions such as stabilizing the mixture, inhibiting corrosion and making the fluid easily discernable from water.

A typical antifreeze/water mixture designed for use in an internal combustion engine makes use of an approximately 50—50 mixture of ethylene glycol and water. The resultant mixture will have a boiling point of approximately 235 degrees Fahrenheit and a freezing point of approximately minus 35 degrees Fahrenheit.

The freezing and boiling point temperatures listed in the above example are typical for a relatively unused, freshly mixed quantity of coolant fluid. However, the characteristics of the liquid change significantly over time and with usage in the engine. The alcohols/glycols break down and are converted into related acids such as glycolic acid, oxalic acid and formic acid. This causes a lowering of the fluid's boiling point and a raising of its freezing point. In addition, the acids created by the breakdown of the glycols/alcohols change the ph level of the coolant from approximately 10 (for fresh coolant) down to approximately 7 for old, used coolant.

As the ph level of the coolant decreases, the coolant becomes increasingly corrosive to the exposed metal parts of the engine. Over time, the metal parts become weakened and begin to disintegrate. Also over time, particles of dirt, salt, metal oxides and other metallic and non-metallic particles become entrained or dissolved in the coolant fluid. As an added consequence, some of the particles in the fluid settle on or adhere to the exposed metal surfaces of the engine and effectively reduce the cooling efficiency of the system. In addition, these particles tend to clog small passages in the engine and radiator and thereby cause reduced cooling capacity and create hot spots in the engine. These particles can also build up in the water pump and cause it to fail.

To avoid the above noted problems, replacement of a vehicle's coolant is a routine maintenance procedure that is performed at regular intervals. The old coolant is drained from the engine and replaced with new, fresh coolant. The old coolant is then either disposed of or recycled.

Used engine coolant normally cannot be disposed of by pouring it into a municipality's sewage system. The coolant is toxic and contains dissolved or entrained metals that are not easily broken down. In addition, the glycol and/or alcohol components remaining in solution are still usable and are valuable materials. For these reasons, a concerted effort is being made to recycle the large quantities of used engine coolant that are removed during vehicle maintenance.

The recycling of used engine coolant is normally a complex and expensive process. Miller (U.S. Pat. No. 4,946,595) teaches a typical system for recycling used coolant. He shows a sophisticated apparatus that employs multiple filters and a central tank. A high pressure pump is employed as well as a plurality of valves to control the liquid flow.

All of the recycling equipment presently used for antifreeze is similar to Miller in that the equipment is complex, requires a significant of space, and is extremely expensive to acquire and to operate. It is economically unfeasible for a typical vehicle servicing facility to own such equipment. As a result, antifreeze collected by these facilities is often disposed of and is not recycled. In some cases, the used antifreeze is collected over time until it can be transported to a recycling plant that specializes in the recycling of such fluids. In this latter situation, recycling of the used coolant is extremely inconvenient and is still expensive.

SUMMARY OF THE INVENTION

The invention is a system for recycling engine coolant and other fluids. The system makes use of a moderately-sized tank and is designed to process relatively small amounts of used coolant over along period of time.

The tank is preferably fabricated from a standard fifty-five gallon steel drum. Located at opposite ends of the top of the tank are two vertically-oriented standpipes. Each standpipe is fabricated from a length of large diameter pipe and is open at the bottom to the interior of the tank.

The first of the two standpipes is the input standpipe and is used for inputting used antifreeze into the tank. This standpipe has a lower portion that extends into the tank to a point near the tank's bottom surface. The top of the standpipe is fully open to facilitate the entry of the coolant. Located a short distance below the top of the standpipe is a scum clean-out port that is preferably controlled using a standard-type valve.

The second standpipe is the outlet standpipe through which the coolant product is outputted from the tank. The bottom of this standpipe is flush with the tank's top surface and is in fluid communication with the interior of the tank. The standpipe includes a small vent at the top and an outlet port located a few inches below the vent. The outlet port preferably directs the fluid to a de-ionizing cartridge or other type of filtering/treatment cartridge that accomplishes the final finishing step of the liquid purifying portion of the system.

Used coolant normally is a mixture of floating material, clear liquid and heavy particles. The system is designed to isolate the clear liquid and remove from it any undesirable materials. To accomplish this, the used coolant will normally have a residence period of one to two weeks within the tank before the clean liquid passes through the outlet port in the second standpipe. There are typically three purification stages that the coolant passes through before the clean liquid is dispensed from the system.

The first stage occurs when the coolant is entered into the input standpipe. Any floatable material in the coolant rises to the top liquid level in the standpipe and is captured therein. The liquid coolant eventually passes through the bottom of the standpipe and enters the large volume of liquid located in the interior of the tank.

Once the liquid leaves the first standpipe, the second purification stage begins. Over time, the coolant mixes with the coolant already in the tank and heavy materials come out of solution and settle to the bottom of the tank. Gravity also acts on the liquid coolant in the tank to separate the liquid into layers, with the purest, least-dense fluid becoming located at the top of the tank.

In the third purification stage, the topmost layer of liquid is drawn from the top of the tank into the bottom opening of the second standpipe. The lightest of this liquid travels upwardly in the standpipe and is directed to the outlet port where it then proceeds into the filter cartridge for the last stage of purification. It should be noted that in some instances, when the liquid that exits from the outlet port is sufficiently clean to require no further purification, the filter cartridge is not employed.

When a user enters used coolant into the input standpipe, the weight of the liquid causes an equal volume of relatively clean liquid to be dispelled from the outlet standpipe. It should be noted that the outputted material causes a siphon effect that is broken only once the fluid level in the output standpipe falls to a point where air entering from the vent reaches the output port.

The basic system can be modified in a number of ways. For example, to speed up the process, oxidants can be mixed with the used coolant as it is entered into the first standpipe. In another variation of the process, anion and cation resins may be placed within the tank for the deionization of the inputted coolant.

Once the cleaned coolant leaves the tank, materials are normally added to the fluid so that its characteristics match those of unused antifreeze. The added materials would usually include anti-corrosion substances, new glycol and/or alcohol components, dyes, and stabilizers. This last step can be completed by the personnel of a vehicle repair facility using relatively inexpensive instruments.

The system does not require a pump or sophisticated screens and filters. The system relies primarily on the natural sedimentation and clarification processes that act on a fluid over an extended period of time. The system takes up little space, is low in cost and is easy to operate. This allows the system to be utilized by and located at a typical vehicle servicing facility.

DETAILED DESCRIPTION OF THE INVENTION

Figure 1:
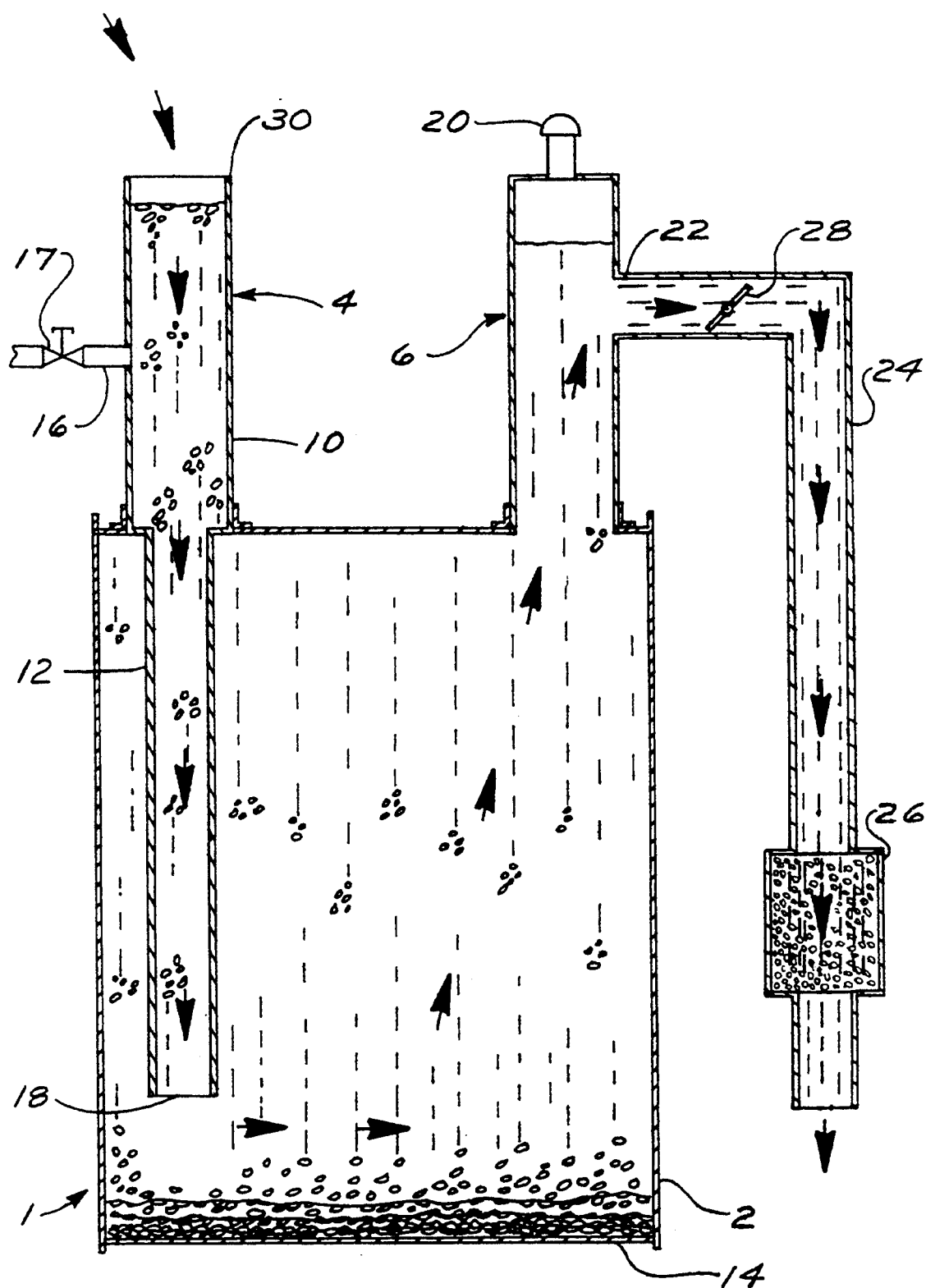
FIG. 1 is a schematic representation of an antifreeze recycling system in accordance with the invention.

Referring now to the drawings in greater detail, wherein like reference characters refer to like parts throughout the several figures, there is shown by the numeral 1 the processing unit that forms the main part of an antifreeze recycling system in accordance with the invention.

The unit includes a drum-shaped settling tank 2 that has a first standpipe 4 and a second standpipe 6. The tank 2 is preferably fabricated from a standard fifty-five gallon steel drum (having typical dimensions of approximately two feet high by three feet in diameter) that is placed on end as shown. Alternately, the tank can be oriented on its side with its longitudinal axis lying in a horizontal plane and the two standpipes extending upwardly from what used to be the side of the tank.

The first standpipe 4 is the input standpipe and is open at its top and bottom ends. The standpipe preferably has a large diameter portion 10 located above the tank and a smaller diameter portion 12 that extends downwardly into the tank and ends near the tank's bottom surface 14. The large diameter of the top portion provides an increased area to trap floating matter. Located in the top portion of the standpipe is a clean-out port 16 that extends to a valve 17. The clean-out port allows a user to drain from the standpipe any fluid or floating matter that is located above the port.

The second standpipe 6 is the output standpipe and is open to the top-most part of the interior of the tank at its bottom end 18. Standpipe 6 is preferably of the same diameter as the top portion 10 of the input standpipe. Located at the top of the standpipe is a vent 20 that is open to the ambient environment. Located below the top of the standpipe is an outlet port 22. The port extends into pipe 24 which is preferably connected to a finishing cartridge 26. A valve 28 is located in the piping to allow manual control of the flow of liquid in the pipe. The cartridge 26 is used to remove any remaining dissolved minerals and metals from the liquid and preferably includes anion and cation resins.

The method of operation of the unit will now be described. The arrows in FIG. 1 show the progress of liquid through the apparatus.

The unit will normally be filled with used antifreeze that is in the process of becoming cleaned. The liquid levels in the standpipes will be as shown in FIG. 1. A quantity of used antifreeze, typically one to two gallons, is poured into the open top 30 of the input standpipe 4. Within the standpipe 4, the first stage of the reclamation process occurs.

The newly entered antifreeze mixes with the liquid already in the standpipe and tends to slowly settle toward the bottom. Any floatable material entrained in the liquid rises within the standpipe and collects at the top of the standpipe. This floating material is drained at a later time via the clean-out port 16. At the same time, any heavy particles fall directly downwards where they exit from the bottom of the standpipe and collect at the bottom of the tank. The bulk of the newly entered used antifreeze eventually exits from the bottom of the standpipe and mixes with the used antifreeze in the interior of the tank. At this point, the second stage of the reclamation process begins.

As the used antifreeze mixes with the antifreeze already in the unit, entrained particles continue to fall out of suspension and settle to the bottom of the unit. Over a long period of time, a degree of oxidation takes place and the dissolved metals become oxidized and settle with the other particles and salts at the bottom of the unit.

Gravity causes the liquid in the tank to separate into layers of varying densities with the top layer being the lightest and containing almost no impurities. The lowest density liquid also fills the output standpipe 6. Whenever new liquid is added to the unit via the input standpipe 4, manometric action causes additional liquid in the top layer within the tank to move into the output standpipe. The addition of new liquid also causes the relatively clean liquid within the standpipe to be outputted via the outlet port 22 and to pass into piping 24. The liquid is then preferably directed to cartridge 26 for final treatment. The liquid exits from the cartridge (or piping 24 if a finishing cartridge is not employed) and is then captured in a container (not shown). The third purification stage encompasses the collection of the liquid into the output standpipe and also any finishing processes the liquid might undergo before exiting from the apparatus.

The container of clean liquid is then mixed with anticorrosion materials, dyes, stabilizers (if necessary) and additional glycol-based and/or alcohol-based components to return it to its original, like-new condition. The liquid antifreeze is then ready for reuse.

As an alternate to the process described above, the reclamation process can be modified by the addition of oxidizing agents with the inputted used antifreeze. The agents act to facilitate the precipitation of dissolved materials and neutralize the acids.

Figure 2:
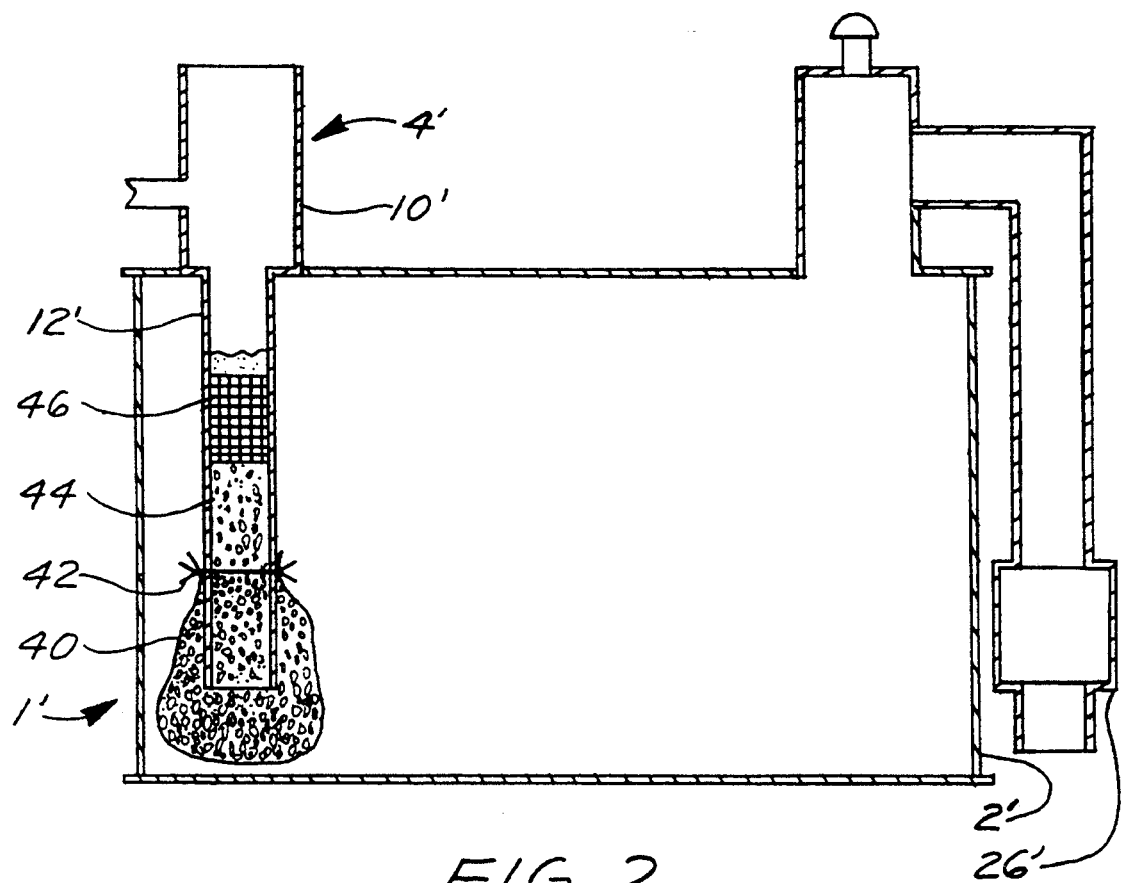
FIG. 2 is a schematic representation of a second embodiment of an antifreeze recycling system in accordance with the invention.

FIG. 2 shows a second embodiment of the invention. In this embodiment, the basic structure of the unit 1' is unchanged. However, a cloth filter bag 40 is tightly secured to the bottom of the input standpipe 4' using a circular fastener 42. Within the cloth bag is an anion resin bed 44 and a cation resin bed 46 that together function to remove dissolved metals and minerals from the liquid. The inputted used antifreeze must pass through these two beds of materials before mixing with the used antifreeze already within the main body of the tank 2. In this embodiment, the finishing cartridge 26' is optional. If used, the cartridge may contain other deionizing chemicals or a fine filter.

Figure 3:
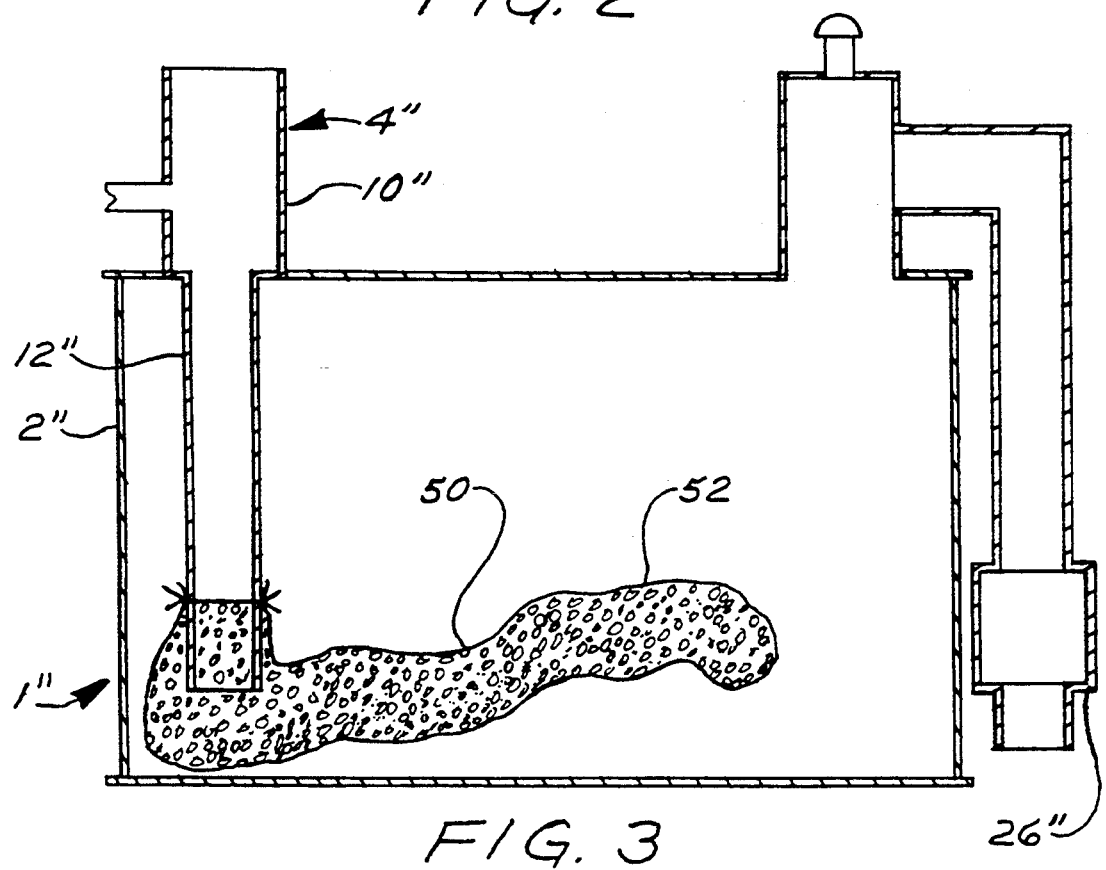
FIG. 3 is a schematic representation of a third embodiment of an antifreeze recycling system in accordance with the invention.

FIG. 3 shows a third embodiment of the invention. This embodiment is similar to the second embodiment except that a filter bag 50 extends into the main body of the tank 2" and floats in the liquid. Located within the bag is a mixed bed 52 of anion and cation resins that function to remove dissolved metals and minerals from the liquid as it passes through the bag before mixing with the liquid in the main body of the tank 2". In this embodiment, the finishing cartridge 26" is optional. If used, the cartridge may contain other deionizing chemicals or a fine filter.

Figure 4:
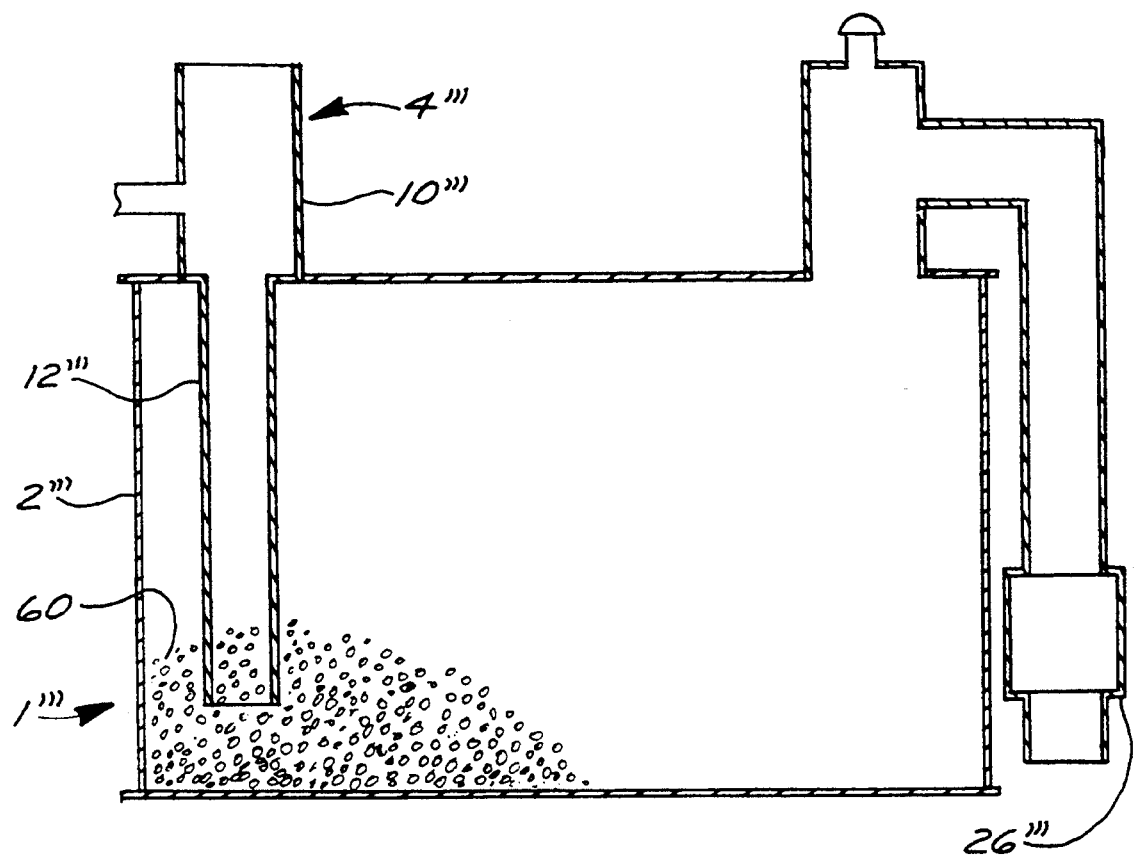
FIG. 4 is a schematic representation of a fourth embodiment of an antifreeze recycling system in accordance with the invention.

FIG. 4 shows a fourth embodiment of the invention. In this embodiment, a mixture of anion and cation resins is poured through the input standpipe 4''' and settles at the bottom of the tank 2'''. This forms a mixed bed 60 of anion and cation resins that completely covers the bottom opening of the standpipe 4'''. As in the previously described embodiments, the used antifreeze must pass through the resin bed before mixing with the antifreeze contained in the main body of the tank 2'''. In this embodiment, the finishing cartridge 26''' is optional. If used, the cartridge may contain other deionizing chemicals or a fine filter.

It should be noted that the apparatus of the invention can also be used to remove impurities from liquids other than antifreeze. The basic concept used of clarifying the inputted liquid by gravity settling of the impurities is applicable to most liquids however, the required residence time within the apparatus would be proportional to the viscosity of the liquid.

The embodiments disclosed herein have been discussed for the purpose of familiarizing the reader with the novel aspects of the invention. Although preferred embodiments of the invention have been shown and described, many changes, modifications and substitutions may be made by one having ordinary skill in the art without necessarily departing from the spirit and scope of the invention as described in the following claims.

I claim:

1. An antifreeze reclamation system comprising:
   a hollow tank having an interior area;
   a first standpipe means attached to said tank, said standpipe means having a hollow interior, a top end and an open bottom end, said standpipe means being at least partially located above said tank, said top end of the standpipe means including entry means through which used antifreeze may be poured into the interior of the standpipe means, and wherein the bottom end of the standpipe means is in fluid communication with the interior area of the tank;
   a second standpipe means attached to said tank, said second standpipe means having a hollow interior, a top end and an open bottom end, said second standpipe means being at least partially located above said tank, and wherein the bottom end of the second standpipe means is in fluid communication with the interior area of the tank;
   an outlet port located in the second standpipe means and which functions to allow liquid to leave the tank when the tank is full and used antifreeze is being entered into the tank via the first standpipe means; and
   wherein a quantity of anion resin and cation resin is located within the tank and covers the bottom end of the first standpipe means.

2. The system of claim 1 further comprising a drain port in the first standpipe means, said drain port being located between the top and bottom ends of the standpipe, said drain port being operatively connected to a valve wherein a user can open said valve to thereby cause any material located in the first standpipe means at a level above said drain port to drain from said standpipe means.

3. The system of claim 1 wherein the tank is cylindrical in shape.

4. The system of claim 3 wherein the tank is a standard fifty-five gallon drum.

5. The system of claim 1 wherein the first standpipe means includes a first tubular portion located above the tank and a second tubular portion within the tank and wherein the first tubular portion has a greater diameter than the second tubular portion.

6. The system of claim 1 wherein the outlet port that is located on the second standpipe means is connected to piping which leads to a treatment cartridge that includes a liquid treatment means that functions to remove predetermined undesirable impurities from the liquid.

7. The system of claim 6 wherein the cartridge contains an anion resin and a cation resin.

8. The system of claim 1 further comprising a filter bag that surrounds the bottom end of the first standpipe means.

9. The system of claim 8 wherein the anion and cation resins are located within the filter bag attached to the first standpipe means.

10. The system of claim 9 wherein the filter bag that is attached to the first standpipe has an elongated shape that extends into the interior of the tank away from the first standpipe.

11. The system of claim 1 wherein the bottom end of the first standpipe means is located proximate a bottom surface of the tank and wherein the bottom end of the second standpipe means is located proximate a top surface of the tank.

12. A process for recycling antifreeze, said process comprising:

pouring used antifreeze into a first, hollow standpipe that is mounted to the top of a hollow tank that has an interior area filled with used antifreeze, said antifreeze that is poured into the first standpipe being allowed to flow through said standpipe into the interior area of the tank and wherein while the antifreeze is within the standpipe, any floatable material in the antifreeze is allowed to float to the top of the standpipe and is removed from said standpipe via a drain port;

allowing the used antifreeze to remain within the tank for at least a predetermined amount of time wherein particulate matter can fall out of solution due to gravity and collect on the bottom of the tank and wherein the used antifreeze can separate into horizontally-oriented layers of liquid with each liquid layer having a different density and the lightest density liquid becoming located proximate a top surface of the tank; and removing the lightest density liquid from the tank via a second standpipe that is located above the tank and is in fluid communication with a top portion of the tank's interior area.

13. The process of claim 12 further comprising adding new materials to the liquid removed from the second standpipe, said materials acting to raise the liquid's boiling point and to lower the liquid's freezing point.

14. A liquid purification system comprising:
a hollow tank having an interior area;

a first standpipe means attached to said tank, said standpipe means having a hollow interior, a top end and an open bottom end, said standpipe means being at least partially located above said tank, said top end of the standpipe means including entry means through which a liquid may be poured into the interior of the standpipe means, and wherein the bottom end of the standpipe means is in fluid communication with the interior area of the tank;

a second standpipe means attached to said tank, said second standpipe means having a hollow interior, a top end and an open bottom end, said second standpipe means being at least partially located above said tank, and wherein the bottom end of the second standpipe means is in fluid communication with the interior area of the tank;

an outlet port located in the second standpipe means and which functions to allow liquid to leave the tank when the tank is full and liquid is being entered into the tank via the first standpipe means; and a drain port in the first standpipe means, said drain port being located between the top and bottom ends of the standpipe, said drain port being operatively connected to a valve wherein a user can open said valve to thereby cause any material located in the first standpipe means at a level above said drain port to drain from said standpipe means.

15. The system of claim 14 wherein the tank is a standard fifty-five gallon drum.

16. The system of claim 14 wherein a quantity of anion resin and cation resin is located within the tank.

17. The system of claim 14 wherein the first standpipe means is comprised of a first portion located exterior to the tank and a second portion located within said tank and wherein said second portion includes only a single opening located at the bottom end of the standpipe.

18. The system of claim 14 wherein the second standpipe means is in the form of a straight tube and wherein the bottom end of the second standpipe means is substantially flush with a top portion of said tank.

* * * * *